(12) United States Patent
Draeger et al.

(10) Patent No.: US 12,703,065 B2
(45) Date of Patent: Aug. 11, 2026

(54) CLAMP FOR LASER LEVEL DETECTOR

(71) Applicant: Milwaukee Electric Tool Corporation, Brookfield, WI (US)

(72) Inventors: David W. Draeger, Sussex, WI (US); John Norbert Winkler, Milwaukee, WI (US); Max D. Mutza, Pewaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 861 days.

(21) Appl. No.: 17/835,606

(22) Filed: Jun. 8, 2022

(65) Prior Publication Data

US 2022/0395963 A1 Dec. 15, 2022

Related U.S. Application Data

(63) Continuation of application No. PCT/US2022/032633, filed on Jun. 8, 2022.

(60) Provisional application No. 63/208,731, filed on Jun. 9, 2021.

(51) Int. Cl.
*B25B 5/02* (2006.01)
*B25B 5/10* (2006.01)
*G01C 15/00* (2006.01)

(52) U.S. Cl.
CPC ................ *B25B 5/02* (2013.01); *B25B 5/102* (2013.01); *G01C 15/004* (2013.01)

(58) Field of Classification Search
CPC ........... B25B 5/02; B25B 5/102; B25B 5/163; B25B 5/166; B25B 5/003; B25B 5/006; B25B 41/22; B25B 1259/04; G01C 15/004; B23Q 3/06
USPC ....... 33/286, 299; 248/316.4, 316.5; 269/74, 269/79, 80, 81, 251
See application file for complete search history.

(56) References Cited

U.S. PATENT DOCUMENTS 2,564,566 A * 8/1951 Duffy ........................ B25B 1/22 33/551
3,894,805 A 7/1975 Middleton
5,033,709 A 7/1991 Yuen
5,457,890 A 10/1995 Mooty
5,551,159 A 9/1996 Mooty
5,733,061 A 3/1998 Child
5,970,812 A 10/1999 Fan
6,209,832 B1 4/2001 Yamazaki
(Continued)

FOREIGN PATENT DOCUMENTS

CN 1042055 2/1999
CN 201881290 6/2011
(Continued)

OTHER PUBLICATIONS

Translation of DE202014100454, May 28, 2014, Nedo GmbH & Co.

(Continued)

*Primary Examiner* — Robert F Neibaur
(74) *Attorney, Agent, or Firm* — Reinhart Boerner Van Deuren s.c.

(57) ABSTRACT

A clamp for laser level detectors release mechanism is provided. The clamp includes a body, a shaft slidably coupled to the body, a fixed jaw, and a moveable jaw coupled to the shaft. The clamp permits adjusting the position and orientation of the laser level detector while the clamp remains coupled to a work piece.

5 Claims, 12 Drawing Sheets

(56) References Cited

U.S. PATENT DOCUMENTS

| | | | | |
|---|---|---|---|---|
| 6,256,895 | B1 | 7/2001 | Akers | |
| 6,398,175 | B1 | 6/2002 | Conner et al. | |
| 6,438,854 | B1 | 8/2002 | Kott, Jr. | |
| 6,584,697 | B1 | 7/2003 | Guoan et al. | |
| 6,594,910 | B2 | 7/2003 | Wishart | |
| 6,598,304 | B2 | 7/2003 | Akers | |
| 6,804,893 | B2 | 10/2004 | Watson et al. | |
| 6,964,106 | B2 | 11/2005 | Sergyeyenko et al. | |
| 7,414,704 | B1 | 8/2008 | Nau | |
| 7,441,339 | B2 | 10/2008 | Kallabis | |
| 7,441,981 | B2 | 10/2008 | Crain et al. | |
| 7,448,138 | B1 | 11/2008 | Vanneman | |
| 7,533,712 | B2 | 5/2009 | Whittemore et al. | |
| 7,635,119 | B1 * | 12/2009 | Patel | B23Q 1/25 269/73 |
| 7,658,219 | B2 | 2/2010 | Whittemore | |
| 7,669,816 | B2 | 3/2010 | Crain et al. | |
| 8,066,051 | B2 | 11/2011 | Whittemore | |
| 8,191,851 | B2 | 6/2012 | Crown | |
| 8,267,365 | B2 | 9/2012 | Wiest et al. | |
| 8,371,360 | B2 | 2/2013 | Whittemore | |
| 8,490,937 | B2 | 7/2013 | Crain et al. | |
| 8,511,635 | B2 | 8/2013 | Steffen | |
| 8,517,366 | B2 | 8/2013 | Seber et al. | |
| 8,668,182 | B2 | 3/2014 | Steffen et al. | |
| 8,857,499 | B2 | 10/2014 | Whittemore | |
| 8,960,062 | B2 * | 2/2015 | Chen | B25B 5/16 83/466 |
| 9,321,151 | B2 | 4/2016 | Yan | |
| 9,389,074 | B2 | 7/2016 | Esposito | |
| 9,441,392 | B2 | 9/2016 | Whittemore | |
| 9,441,967 | B2 | 9/2016 | Ranieri et al. | |
| 9,513,121 | B2 | 12/2016 | Kallabis | |
| 9,885,571 | B2 | 2/2018 | Hoppe et al. | |
| D812,452 | S | 3/2018 | Matteo | |
| 10,016,851 | B1 | 7/2018 | Dearmond | |
| 10,689,865 | B2 | 6/2020 | Whittemore | |
| 10,773,362 | B2 * | 9/2020 | Howard | B25B 5/10 |
| 11,927,302 | B2 * | 3/2024 | Ritter | F16M 13/022 |
| 2001/0037579 | A1 | 11/2001 | Akers | |
| 2002/0096812 | A1 | 7/2002 | Reed | |
| 2007/0145217 | A1 | 6/2007 | Kimura | |
| 2010/0131237 | A1 | 5/2010 | Pamatmat | |
| 2010/0276555 | A1 | 11/2010 | Steffen et al. | |
| 2016/0202056 | A1 | 7/2016 | Senger | |
| 2017/0008155 | A1 | 1/2017 | Hanlon et al. | |
| 2018/0128611 | A1 | 5/2018 | Hoppe et al. | |
| 2020/0024858 | A1 | 1/2020 | Whittemore | |
| 2020/0083658 | A1 * | 3/2020 | Xu | F16M 13/02 |
| 2020/0225034 | A1 | 7/2020 | Gould et al. | |
| 2021/0247184 | A1 | 8/2021 | Michaud | |

FOREIGN PATENT DOCUMENTS

| | | |
|---|---|---|
| CN | 105300357 | 2/2016 |
| CN | 103967884 | 4/2016 |
| CN | 210165154 | 3/2020 |
| CN | 212251808 | 12/2020 |
| CN | 112414378 | 2/2021 |
| DE | 202012009216 | 2/2013 |
| DE | 102013012293 | 2/2014 |
| DE | 102013012294 | 2/2014 |
| DE | 202014100454 | 5/2014 |
| EP | 1939587 | 7/2008 |
| EP | 1939519 | 6/2011 |
| EP | 3214403 | 1/2019 |
| EP | 2808647 | 6/2019 |
| JP | 06-028630 | 4/1994 |
| JP | 5060616 | 10/2012 |
| KR | 10-2011-0047459 | 5/2011 |
| WO | WO08077658 | 7/2008 |
| WO | WO14166854 | 10/2014 |
| WO | WO18147433 | 8/2018 |
| WO | WO18218866 | 12/2018 |

OTHER PUBLICATIONS

International Search Report and Written Opinion for International Application No. PCT/US2022/032633, dated Sep. 21, 2022, 10 pages.

* cited by examiner 183
110
180
181

183
180
110
181

256
210
246
220
240
222
272
260
252
244
226
242
212
258

246
240
244
254
210
232
226
220
242
260
222

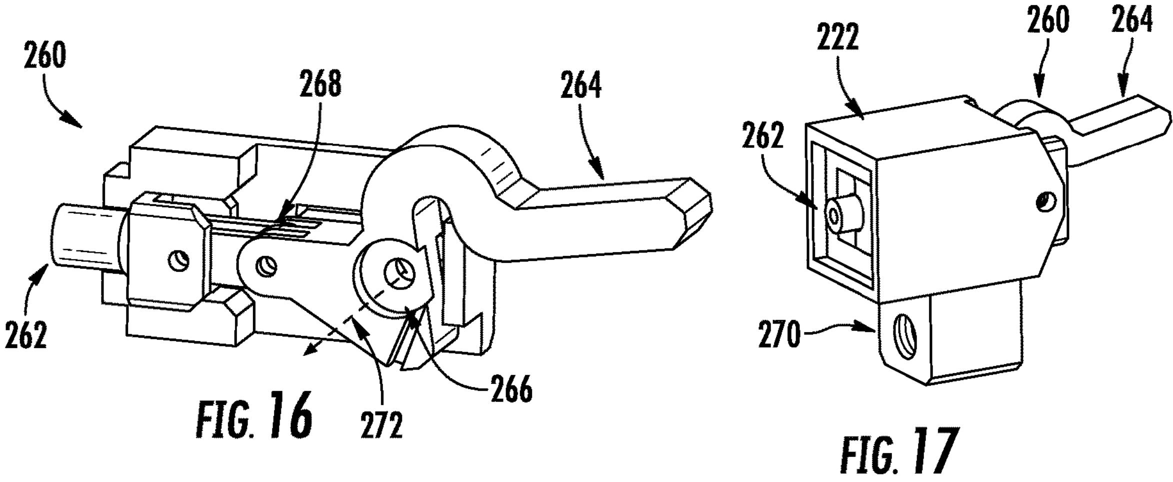
FIG. 16
FIG. 17
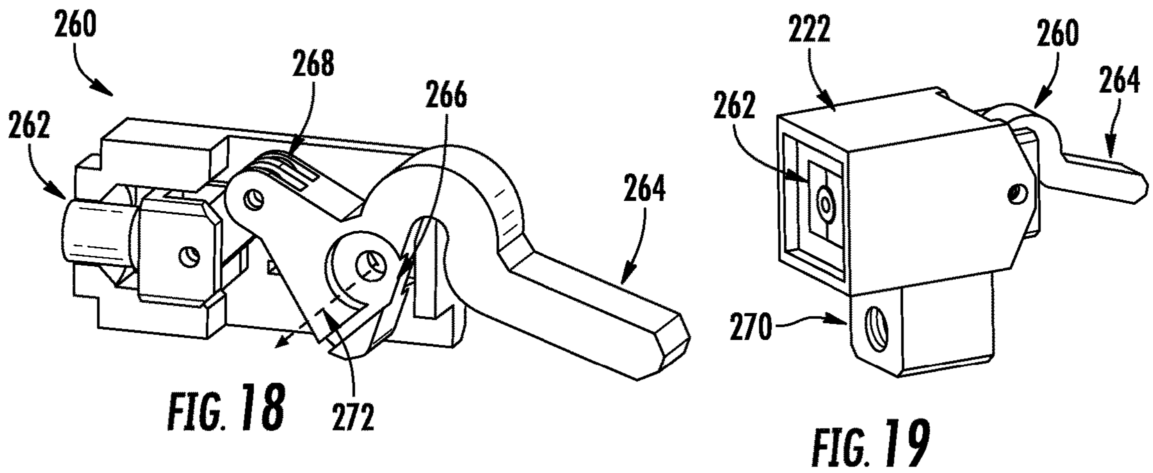
FIG. 18
FIG. 19

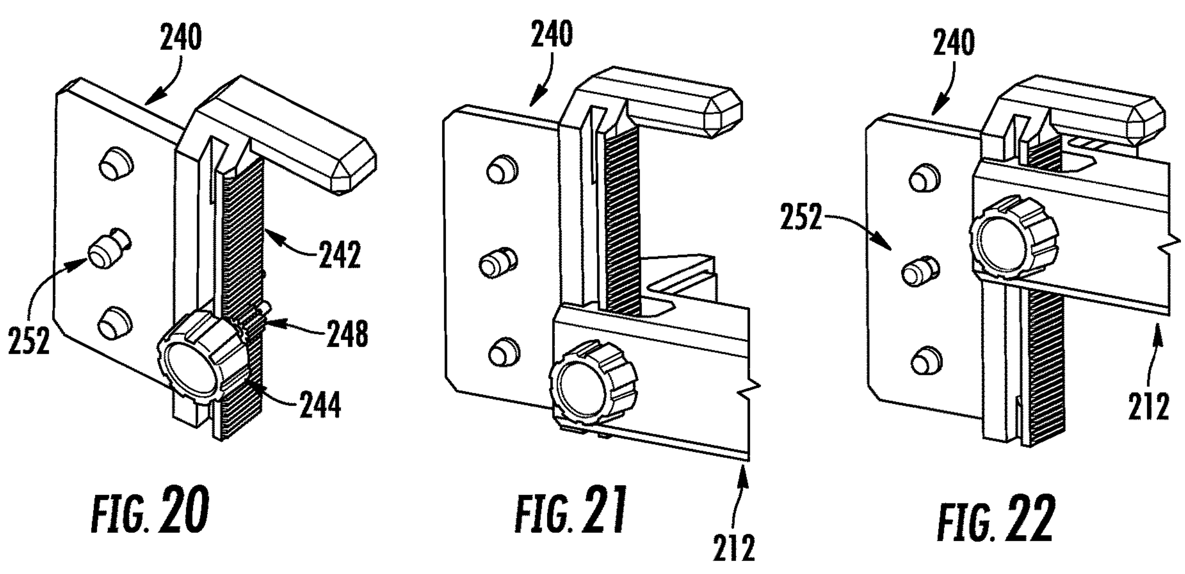
240
242
252
248
244
FIG. 20
240
FIG. 21
212
240
252
212
FIG. 22
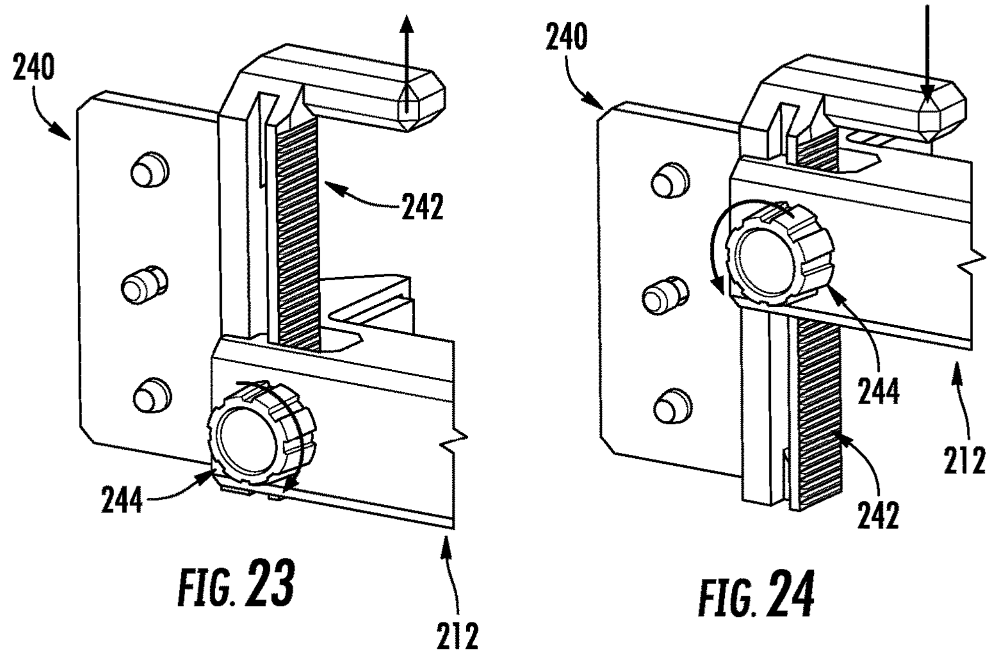
240
242
244
212
FIG. 23
240
244
212
242
FIG. 24

210
220
234
222
264
212
226

210
220
228
232
222
264

210
232
260
222

210
232
260
222

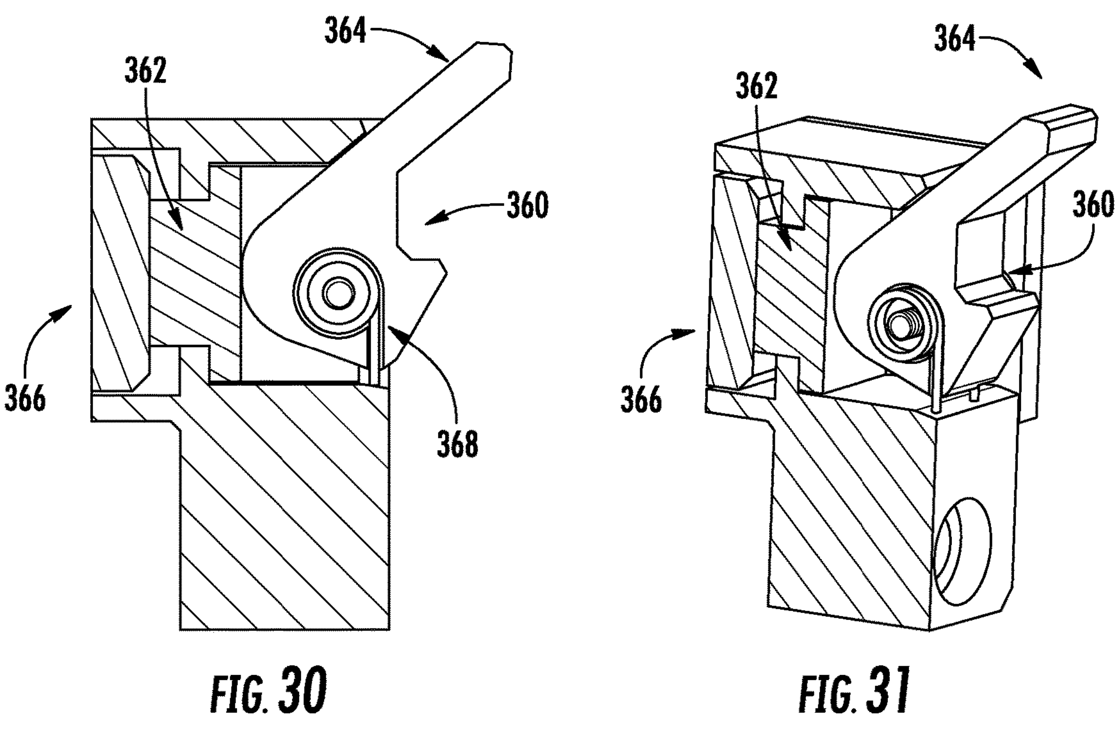
FIG. 30
FIG. 31
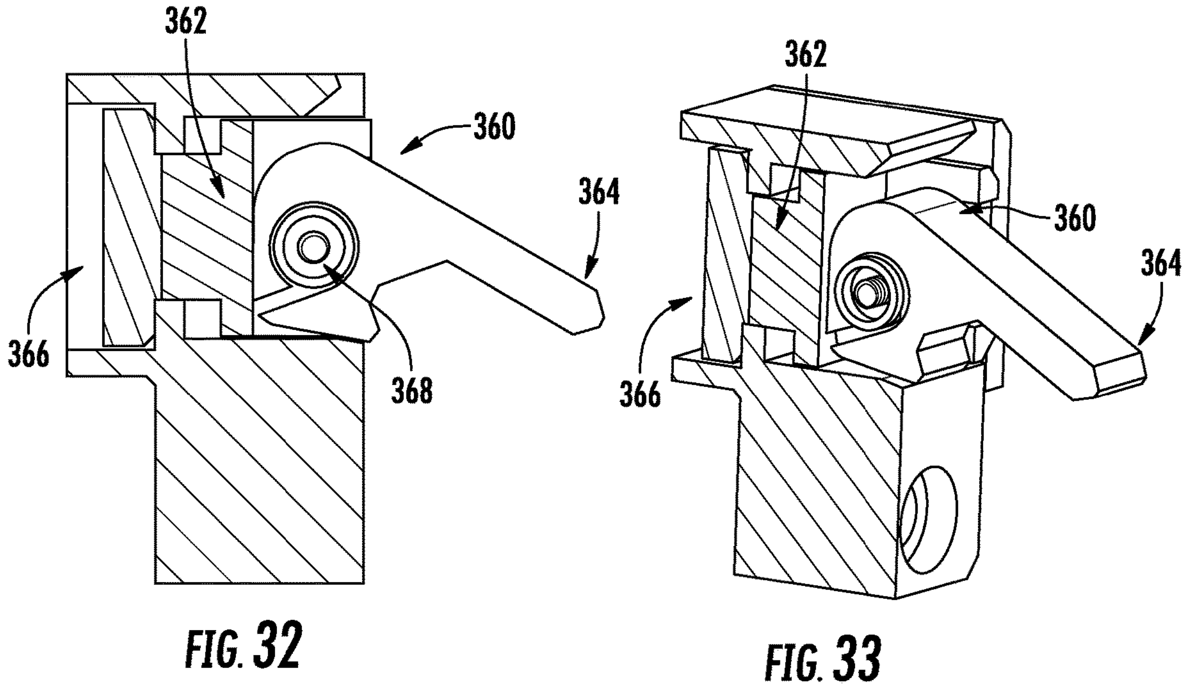
FIG. 32
FIG. 33

CLAMP FOR LASER LEVEL DETECTOR

CROSS-REFERENCE TO RELATED PATENT APPLICATIONS

The present application is a continuation of International Application No. PCT/US2022/032633, filed Jun. 8, 2022, which claims the benefit of and priority to U.S. Provisional Application No. 63/208,731, filed on Jun. 9, 2021, each of which is incorporated herein by reference in its entirety.

BACKGROUND OF THE INVENTION

The present disclosure is directed generally to devices for securing an object to a work piece. The present disclosure relates specifically to clamping devices for holding a laser level detector.

Clamps are often used to couple a device, such as a laser level detector, to a work piece, such as a table. Often, the laser level detector is repositioned in specific locations and/or orientations.

SUMMARY OF THE INVENTION

One embodiment of the invention relates to a laser level system including a laser level detector and a clamp. The clamp includes a body, a plurality of arms extending from the body, the plurality of arms configured to detachably and rigidly couple the body to a structure, and a mounting element rotatably coupled to the body. The mounting element is configured to detachably couple to the laser level detector. The mounting element rotates around a first axis with respect to the body such that the laser level detector and the mounting element rotate together at least 90 degrees around the first axis with respect to the body while the laser level detector is coupled to the mounting element.

Another embodiment of the invention relates to a laser level system including a clamp and a laser level detector. The clamp includes a body, a plurality of arms extending from the body, the plurality of arms configured to detachably and rigidly couple the body to a structure, and a mounting element coupled to the body, the mounting element configured to detachably couple to the laser level detector. The laser level detector is rotatably coupled to the mounting element, and the laser level detector rotatably actuates between a first orientation and a second orientation with respect to the mounting element. The laser level detector is rotated 90 degrees when transitioning from the first orientation to the second orientation.

Another embodiment of the invention relates to a clamp for a laser level detector. The clamp includes a body, a first arm extending from the body, a second arm slidably coupled to the body, an adjustment device configured to slide the second arm along the first axis with respect to the first arm, a securing element coupled to the second arm, a mounting element slidably coupled to the body, and an adjustment mechanism configured to slide the mounting element in a first direction along the first axis with respect to the body and a second direction with respect to the body opposite the first direction. The second arm slides along a first axis towards and away from the first arm, and the first arm and the second arm are configured to detachably and rigidly couple the body to a structure. The securing element is configured to extend an interfacing surface from the second arm towards the first arm, and the structure is coupled between the first arm and the interfacing surface. The mounting element is configured to detachably couple to a laser level detector, and the mounting element slides along a second axis with respect to the body.

Another embodiment of the invention relates to a clamp for a laser level detector. The clamp includes a housing, a plurality of arms extending from the housing, a mounting structure pivotally coupled to the housing, and a mounting element coupled to the mounting structure, the mounting element configured to detachably couple to a laser level detector. The plurality of arms are configured to detachably and rigidly couple the housing to a structure. The mounting structure pivots around a first axis with respect to the housing.

In a specific embodiment, the mounting structure pivots around a second axis with respect to the housing, and the first axis and the second axis are not collinear with each other. In a specific embodiment, the first and second axis are perpendicular to each other. In a specific embodiment, the plurality of arms include a first arm fixedly coupled to the housing and a second arm slidably coupled to the housing.

In various embodiments, the second arm includes a securing element that toggles between a locked and unlocked position. When the securing element is in the locked position the second arm is biased against the structure with an increased force relative to when the securing element is in the unlocked position.

Another embodiment of the invention relates to a clamp for a laser level detector. The clamp includes a housing, a plurality of arms extending from the housing, a mounting structure pivotally coupled to the housing, and a mounting element extending from the mounting structure. The mounting element is configured to detachably couple to a laser level detector. The plurality of arms are configured to detachably and rigidly couple the housing to a structure. The plurality of arms each include an interfacing surface that interfaces with the structure and defines a plane. The mounting element extends from the mounting structure at an angle approximately 45 degrees with respect to the plane.

In a specific embodiment, the laser level detector is configured to couple to the mounting structure in a first orientation and a second orientation, and the laser level detector is rotated 90 degrees when transitioning from the first orientation to the second orientation.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which:

FIG. 16 is a perspective view of the securing element of the clamp of FIG. 14, according to an exemplary embodiment.

FIG. 17 is a perspective view of the second arm of the clamp of FIG. 14 shown with the securing element of FIG. 16, according to an exemplary embodiment.

FIG. 18 is a perspective view of the securing element of FIG. 16, according to an exemplary embodiment.

FIG. 19 is a perspective view of the second arm of the clamp of FIG. 14, according to an exemplary embodiment.

FIG. 20 is a perspective view of a portion of the clamp of FIG. 14, according to an exemplary embodiment.

FIG. 21 is a perspective view of a portion of the clamp of FIG. 14, according to an exemplary embodiment.

FIG. 22 is a perspective view of a portion of the clamp of FIG. 14, according to an exemplary embodiment.

FIG. 23 is a perspective view of a portion of the clamp of FIG. 14, according to an exemplary embodiment.

FIG. 24 is a perspective view of a portion of the clamp of FIG. 14, according to an exemplary embodiment.

FIG. 30 is a side view of a cross-section of a securing element in a second arm, according to an exemplary embodiment.

FIG. 31 is a perspective view of a cross-section of the securing element and second arm of FIG. 30, according to an exemplary embodiment.

FIG. 32 is a side view of a cross-section of the securing element and second arm of FIG. 30 in an alternate configuration from FIG. 31, according to an exemplary embodiment.

FIG. 33 is a perspective view of a cross-section of the securing element and second arm of FIG. 32, according to an exemplary embodiment.

DETAILED DESCRIPTION

Figure 1:
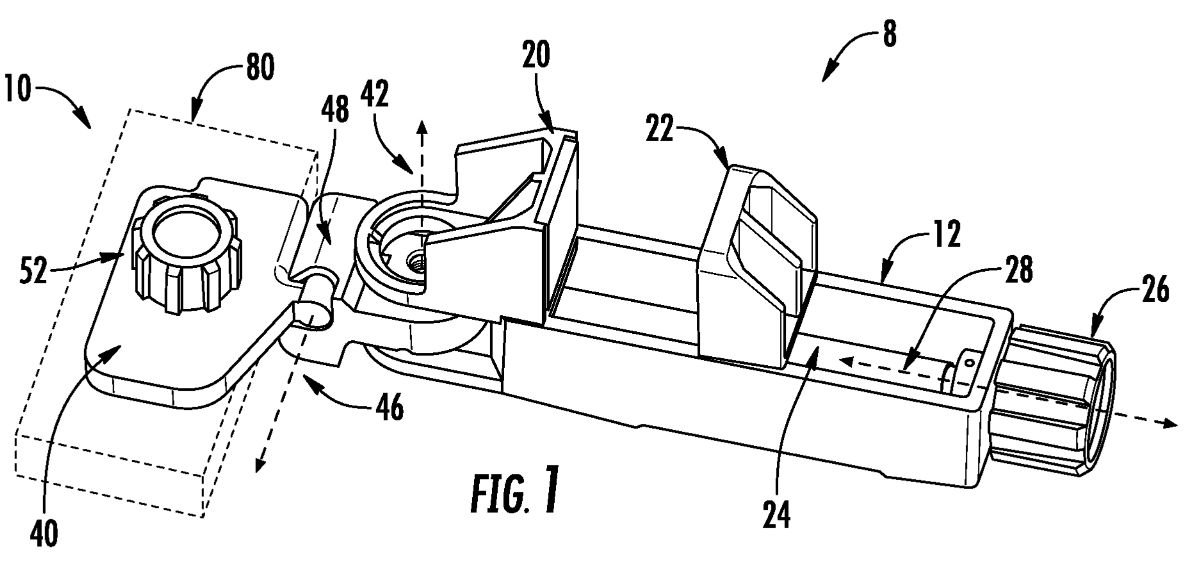
FIG. 1 is a perspective view of a laser level system including clamp, according to an exemplary embodiment.
Figure 2:
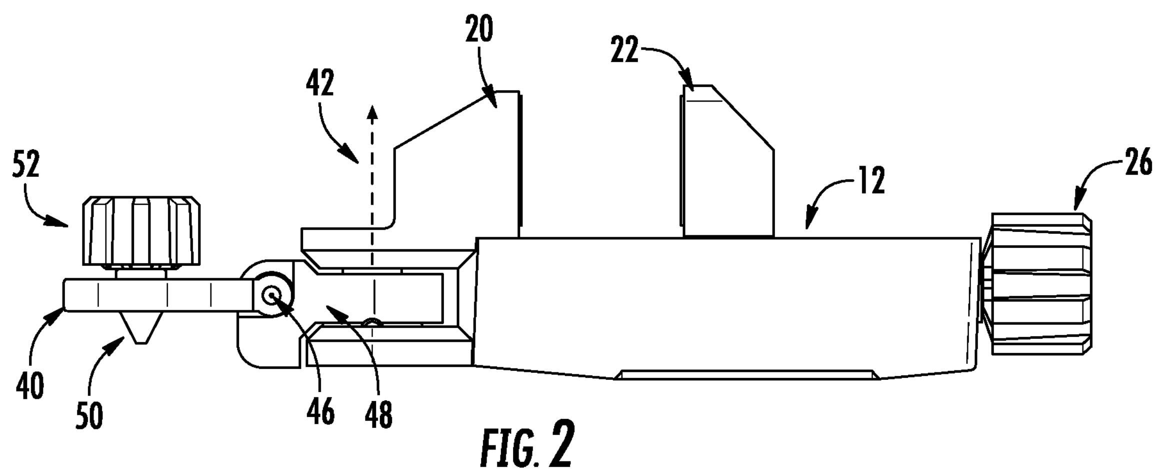
FIG. 2 is a side view of the clamp of FIG. 1, according to an exemplary embodiment.
Figure 3:
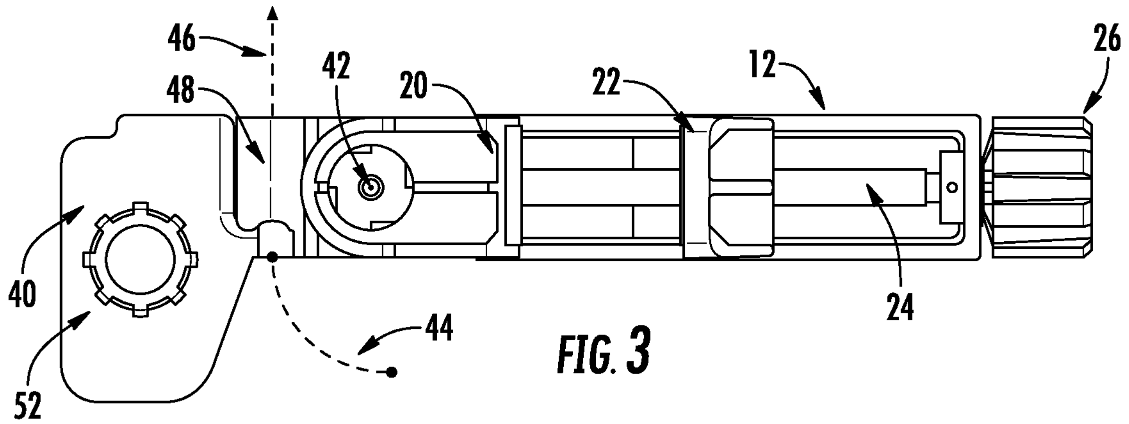
FIG. 3 is a top view of the clamp of FIG. 1, according to an exemplary embodiment.

Referring generally to the figures, an embodiment of a clamp for securing laser level detectors (also referred to as laser level receives) is shown. Clamps are often used to couple pieces of equipment to work pieces. For example, a clamp may be used to couple a laser level detector to a structure, such as a table, a 2×4 or a laser grade rod. The present application provides a clamp with various adjustment mechanisms to reposition and reorient the laser level detector.

In one embodiment, the clamp includes a shaft coupled to a moveable jaw that slides with respect to the body. The moveable jaw can be actuated towards and away from a fixed jaw to couple and decouple the clamp from a work piece, such as a table. The clamp includes a mounting structure that couples to a laser level detector. The mounting structure can be rotated around at least one axis with respect to the body, and optionally two distinct axes. In this way, the laser level detector can be reoriented while the clamp remains coupled to the work piece.

In another embodiment, the clamp includes a mounting structure that couples to a laser level detector. The mounting structure includes a mounting element that extends away from the moveable jaw at a 45 degree angle. The mounting element is configured to couple to a laser level detector in at least two distinct orientations that are perpendicular to each other. In this way, the clamp supports two different and perpendicular orientations for the laser level device (e.g., horizontal and vertical) for any given position of the clamp.

Referring to FIGS. 1-5, a laser level system 8, including a laser level detector 80 and a securing device, shown as clamp 10, is shown according to an exemplary embodiment. Clamp 10 includes body 12, and an elongate structure, shown as screw 24. Clamp 10 includes a plurality of arms extending from body 12, shown as first arm 20 and second arm 22, configured to detachably and rigidly couple body 12 to a structure, such as a work piece. In various embodiments, first arm 20 is rigidly coupled to body 12 and second arm 22 is slidably coupled to body 12, and the second arm 22 slides along axis 28 with respect to the body 12 towards and away from first arm 20.

Clamp 10 permits positioning the laser level detector in at least two positions, such as a horizontal position and a vertical position that are perpendicular with respect to each other. As will be explained, the laser level detector can be actuated between these two positions while the laser level detector remains coupled to clamp 10.

In a specific embodiment, first arm 20 is fixedly coupled to body 12, and second arm 22 is slidably coupled to body 12. To slide second arm 22 with respect to body 12, a user interfaces with an interface element, shown as adjustment knob 26, to rotate screw 24, which in turn slides second arm 22 with respect to body 12. In various embodiments, clamp 10 includes adjustment knob 26 coupled to the body 12, and the adjustment knob 26 is configured to slide the second arm 22 with respect to the body 12. Clamp 10 is configured to couple to a work piece, such as a table or a support structure, via second arm 22 sliding towards first arm 20 to engage the work piece between second arm 22 and first arm 20. In a specific embodiment, first arm 20 and second arm 22 are configured to couple clamp to a 2×4 or a grade rod.

Mounting structure 40 is pivotally coupled to body 12. Clamp 10 includes mounting element 50 coupled to and extends from mounting structure 40. In various embodiments, mounting element 50 is rotatably coupled to body 12 via being coupled to mounting structure 40, and mounting structure 40 is rotatably coupled to body 12. In a specific embodiment, mounting element 50 is configured to detachably couple to a laser level detector via a user adjusting an interfacing element, shown as knob 52.

Mounting structure 40 and mounting element 50 rotate with respect to body 12 around axis 42 over range 44 (FIG. 3) such that the laser level detector 80 and the mounting element 50 rotate around the axis 42 with respect to body 12 while laser level detector 80 is coupled to the mounting element 50. In various embodiments, axis 28 is perpendicular to axis 42. In a specific embodiment, range 44 is least 90 degrees, and more specifically range 44 is exactly 90 degrees. In this way, the position of mounting structure 40 with respect to body 12 can be adjusted to reorient the laser level detector without having to decouple clamp 10 from the work piece.

In a specific embodiment, mounting structure 40 is coupled to body 12 via an intermediate structure, shown as arm 48. Mounting structure 40 pivots with respect to arm 48 around axis 46. In various embodiments, axis 28 is perpendicular to axis 46. Arm 48, and thus also mounting structure 40, pivot with respect to body 12 around axis 42. A user can rotate mounting structure 40 with respect to arm 48 to provide additional orientations in which the laser level detector can be positioned. In a specific embodiment, axis 42 and axis 46 are not collinear with each other. In a specific embodiment, axis 42 and axis 46 are perpendicular to each other. Stated another way, mounting element 50 rotates around a axis 46 with respect to the body 12 such that the laser level detector 80 and the mounting element 50 rotate together at least 90 degrees around the axis 46 with respect to the body 12 while the laser level detector 80 is coupled to the mounting element 50.

In various embodiments a biasing element, such as a spring, biases arm 48 and/or mounting structure 40 around axis 42 with respect to body 12, thereby reducing an amount that arm 48 and/or mounting structure 40 moves with respect to body 12 when clamp 10 is being transported. In various embodiments a biasing element, such as a spring, biases mounting structure 40 around axis 46 with respect to body 12, thereby reducing an amount that mounting structure 40 moves with respect to body 12 when clamp 10 is being transported. For example, the spring is configured to be strong enough to prevent unwanted motion (e.g., of mounting structure 40 with respect to body 12). In various embodiments, the spring is coupled to interlocking features such as detents that prevent and/or inhibit unwanted rotation similar to a clutch.

Figure 4:
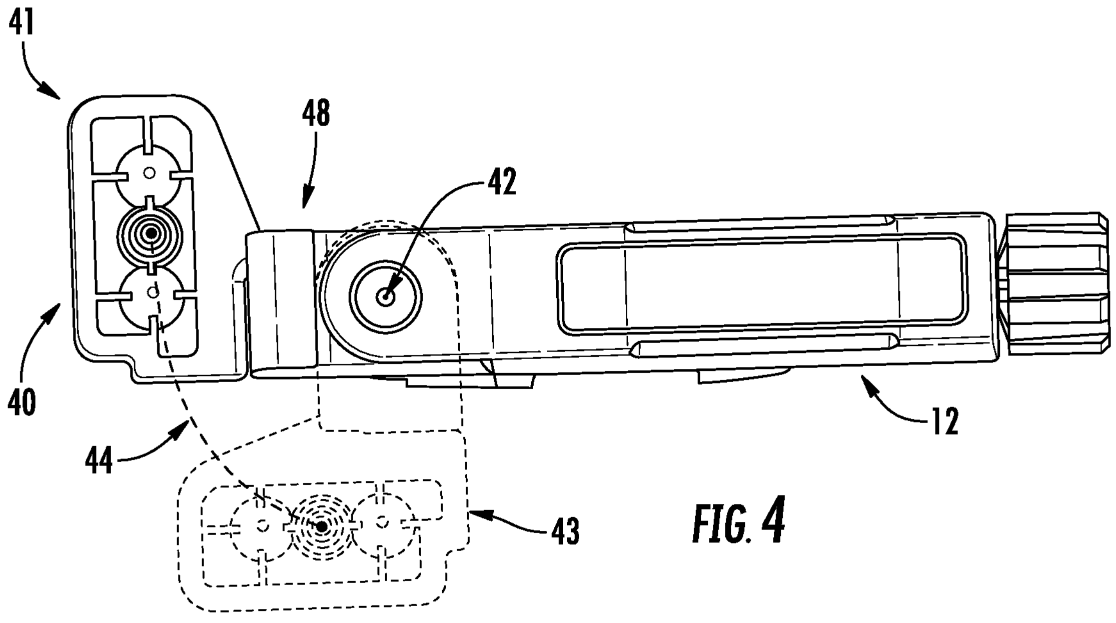
FIG. 4 is a bottom view of the clamp of FIG. 1 shown with a silhouette of an alternate position of the mounting structure, according to an exemplary embodiment.
Figure 5:
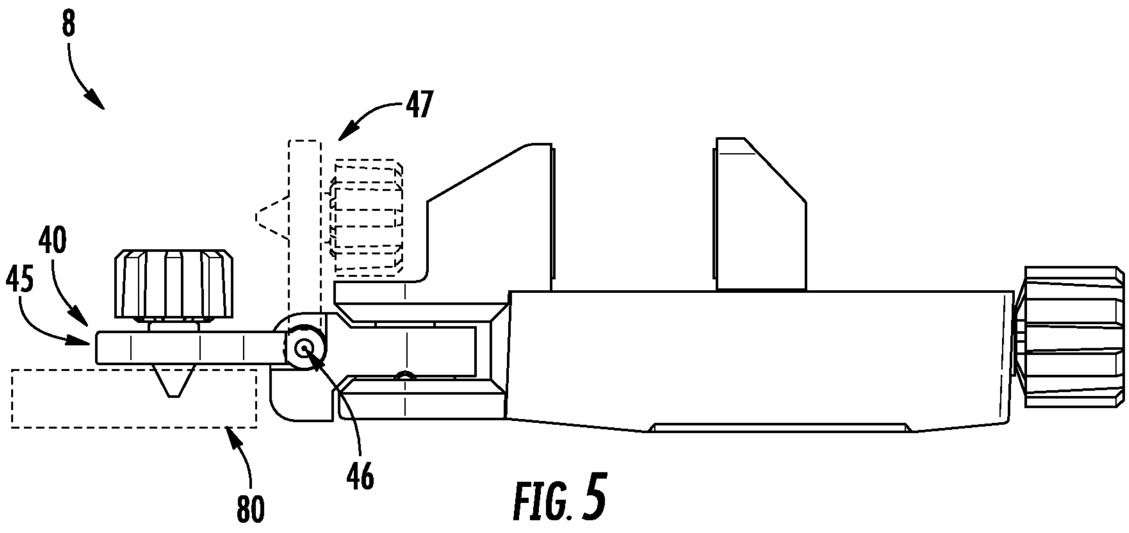
FIG. 5 is a side view of the laser level system of FIG. 1 shown with a silhouette of an alternate position of the mounting structure, according to an exemplary embodiment.

Referring to FIGS. 4-5, various configurations of clamp 10 are shown. Referring to FIG. 4, mounting structure 40 and arm 48 rotate with respect to body 12 around axis 42 between a first position 41 and a second position 43, with second position 43 of mounting structure 40 being shown in silhouette. Referring to FIG. 5, mounting structure 40 rotates with respect to body 12 around axis 46 between a first position 45 and a second position 47, with second position 47 of mounting structure 40 being shown in silhouette. In a specific embodiment, the silhouette orientation shown in FIG. 5 is a storage position of clamp 10 configured to reduce the volume needed to store clamp 10. Alternatively, the silhouette orientation shown in FIG. 5 can be utilized while the laser level detector 80 is active (e.g., if the laser level detector 80 is detecting a vertical line).

In various embodiments, laser level detector 80 is configured to detect signals, such as emitted lasers, from one or more laser levels. For example, in various embodiments laser level detector 80 includes one or more optical detectors, such as on a front face of laser level detector 80. Upon detecting the one or more lasers, laser level detector 80 analyzes the signal generated by the laser and/or communicates information about the one or more lasers (e.g., a position and/or orientation of one of the lasers).

Referring to FIGS. 6-11, laser lever system 108, including detector 180 and clamp 110, is shown according to an exemplary embodiment. Laser level system 108 is substantially the same as laser level system 8 except for the differences discussed herein. Clamp 110 is substantially the same as clamp 10 except for the differences discussed herein.

Clamp 110 includes body 112, and a plurality of arms (e.g., first arm 120 and second arm 122) extending from body 112. The plurality of arms (e.g., first arm 120 and second arm 122) are configured to detachably and rigidly couple the body 112 to a structure.

Figure 6:
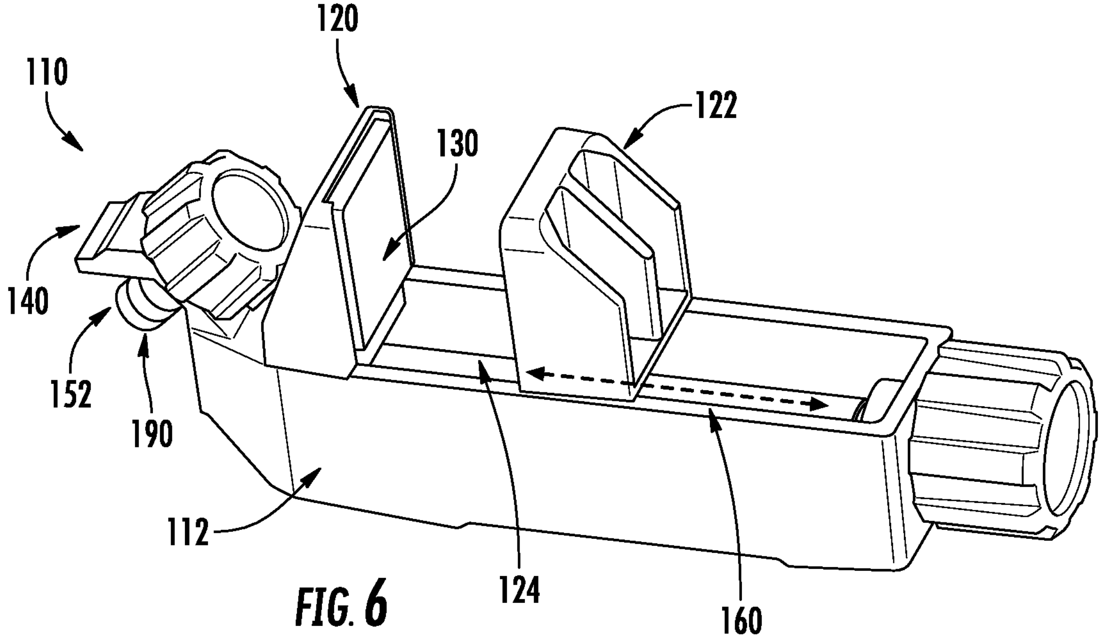
FIG. 6 is a perspective view from above of a clamp, according to an exemplary embodiment.
Figure 7:
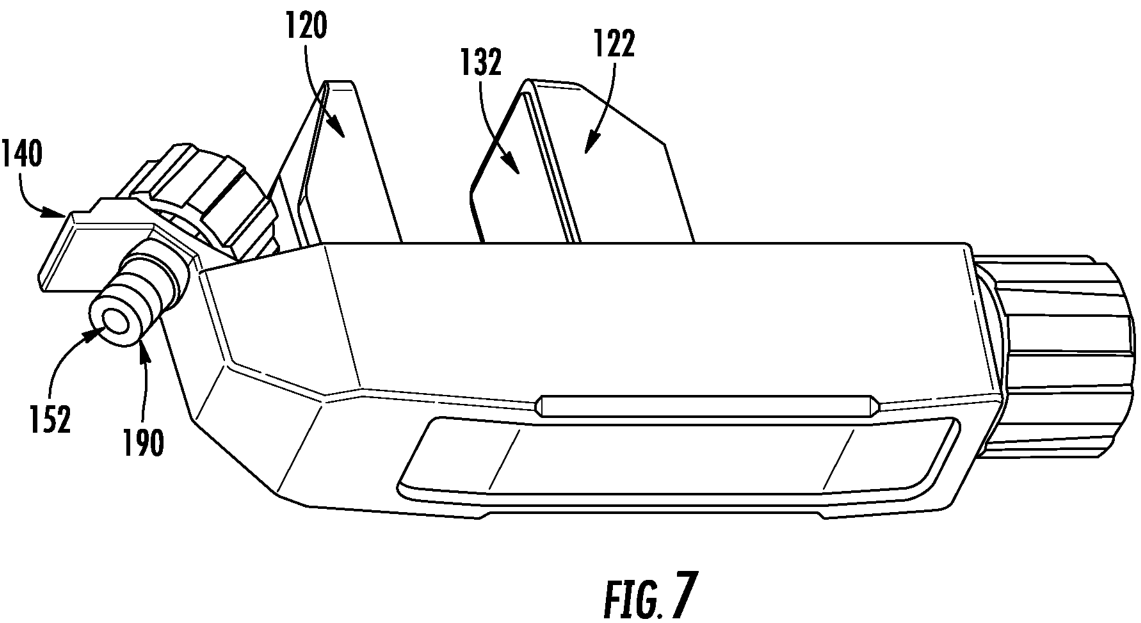
FIG. 7 is a perspective view from below of the clamp of FIG. 6, according to an exemplary embodiment.
Figure 8:
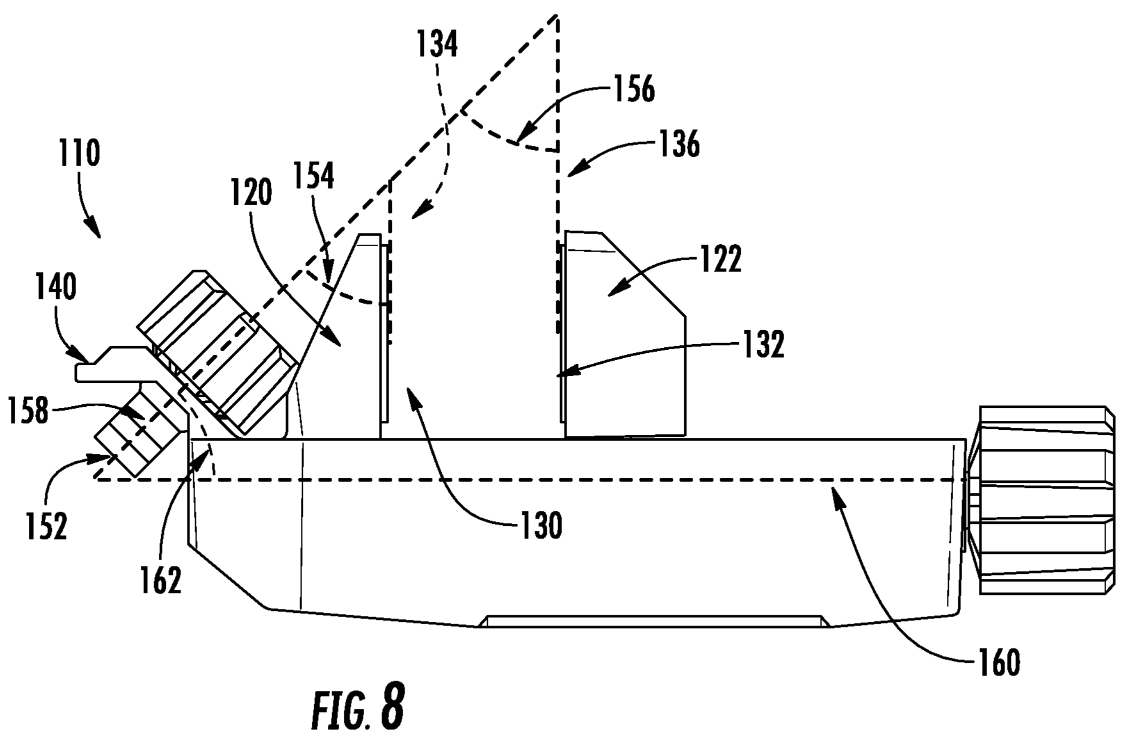
FIG. 8 is a side view of the clamp of FIG. 6, according to an exemplary embodiment.

Referring to FIGS. 6-8, mounting element 152 extends from body 112 and couples to laser detector 180, such as via mounting element 190 of laser level detector 180. Mounting element 190 of laser level detector 180 is shown coupled to 152 and detached from the remainder of laser level detector 180, but in use the remainder of laser level detector 180 is coupled to mounting element 190 (e.g., see FIGS. 9-13).

In various embodiments, the plurality of arms include a first arm 120 rigidly coupled to body 112 and second arm 122 slidably coupled to the body 112. In various embodiments, second arm 122 slides along axis 160 with respect to body 112 and/or first arm 120, axis 160 being the longitudinal axis of body 112 and/or screw 124. First arm 120 includes interfacing surface 130 that interfaces with the structure and defines a first plane 134, and the mounting element 152 extends from the body 112 (e.g., via mounting structure 140) at an angle that is approximately 45 degrees with respect to the first plane 134, and more specifically is 45 degrees. Second arm 122 includes interfacing surface 132 that interfaces with the structure and defines a second plane 136, and the mounting element 152 extends from the body 112 (e.g., via mounting structure 140) at an angle that is approximately 45 degrees with respect to the second plane 136, and more specifically is 45 degrees. Second arm 122 slides with respect to first arm 120 to engage a work piece that clamp 110 couples to. When engaged with the work piece, interfacing surface 130 of first arm 120 and interfacing surface 132 of second arm 122 engage with the work piece to couple the clamp 110 to the work piece. Second arm 122 slides along screw 124, and screw 124 extends along axis 160. In various embodiments, mounting element 152 extends from body 112 (e.g., via mounting element 152 extending from mounting structure 140) at an angle that is approximately 45 degrees with respect to the axis 160, and more specifically is 45 degrees.

Referring to FIG. 8, mounting element 152 is coupled to body 112, such as via mounting structure 140. Mounting element 152 is configured to detachably couple to a laser level detector. Mounting element 152 extends along axis 158 away from mounting structure 140. Axis 158 of mounting element 152 defines angle 154 with respect to plane 134 defined by interfacing surface 130 of first arm 120. Similarly, axis 158 of mounting element 152 defines angle 156 with respect to plane 136 defined by interfacing surface 132 of second arm 122. In a specific embodiment, angle 154 and/or angle 156 are approximately 45 degrees, and more specifically are exactly 45 degrees. Stated another way, in various embodiments laser level detector 180 is rotatably coupled to the mounting element 152 such that laser level detector 180 rotatably actuates between a first orientation and a second orientation with respect to the mounting element 152, and the laser level detector 180 rotates 90 degrees with respect to body 112 when transitioning from the first orientation to the second orientation. Axis 158 of mounting element 152 defines angle 162 with respect to axis 160 of screw 124. In a specific embodiment, angle 162 is approximately 45 degrees, and more specifically is exactly 45 degrees.

Figure 9:
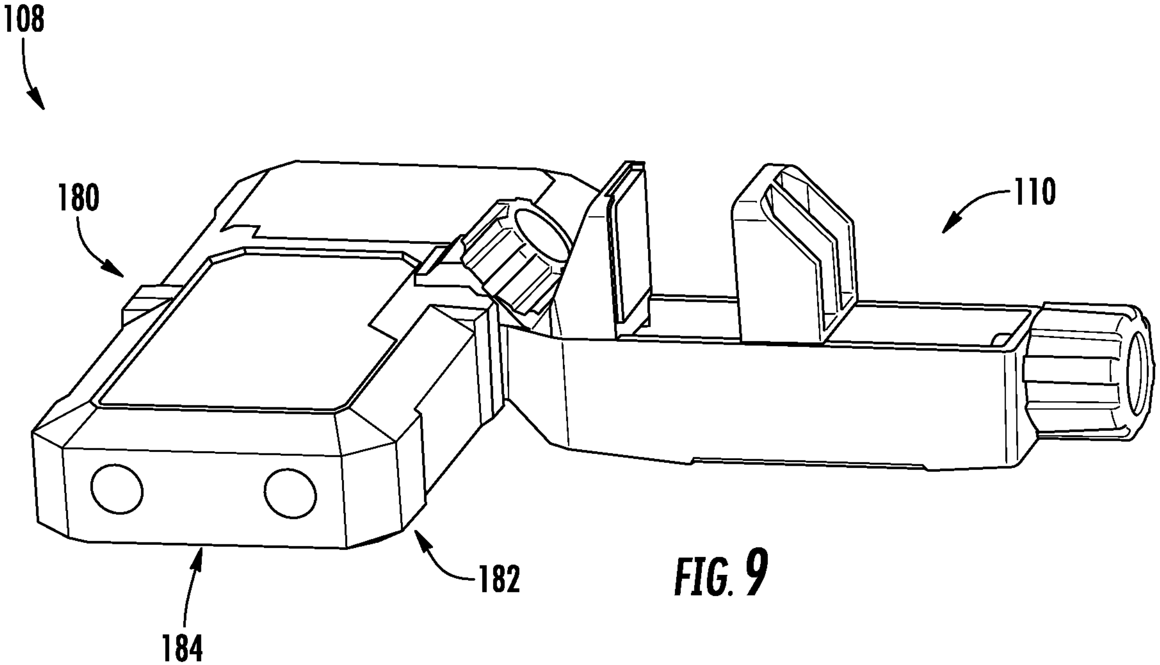
FIG. 9 is a perspective view of a laser level system including the clamp of FIG. 6 coupled to a laser level detector, according to an exemplary embodiment.
Figure 10:
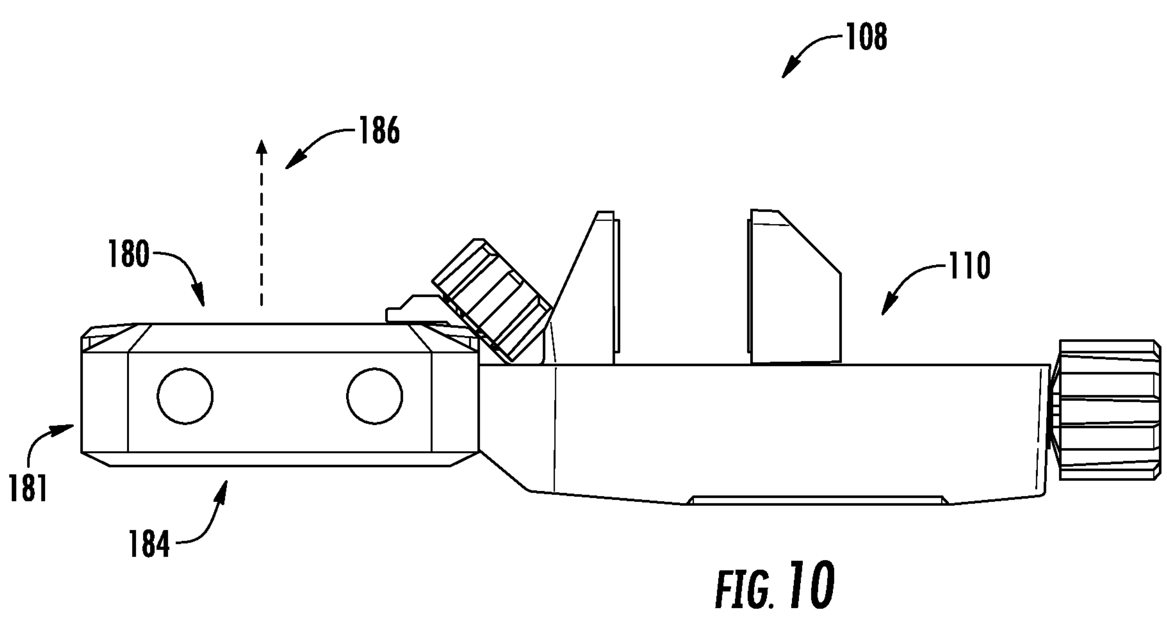
FIG. 10 is a side view of the laser level system of FIG. 9 coupled to the laser level detector of FIG. 9, according to an exemplary embodiment.
Figure 11:
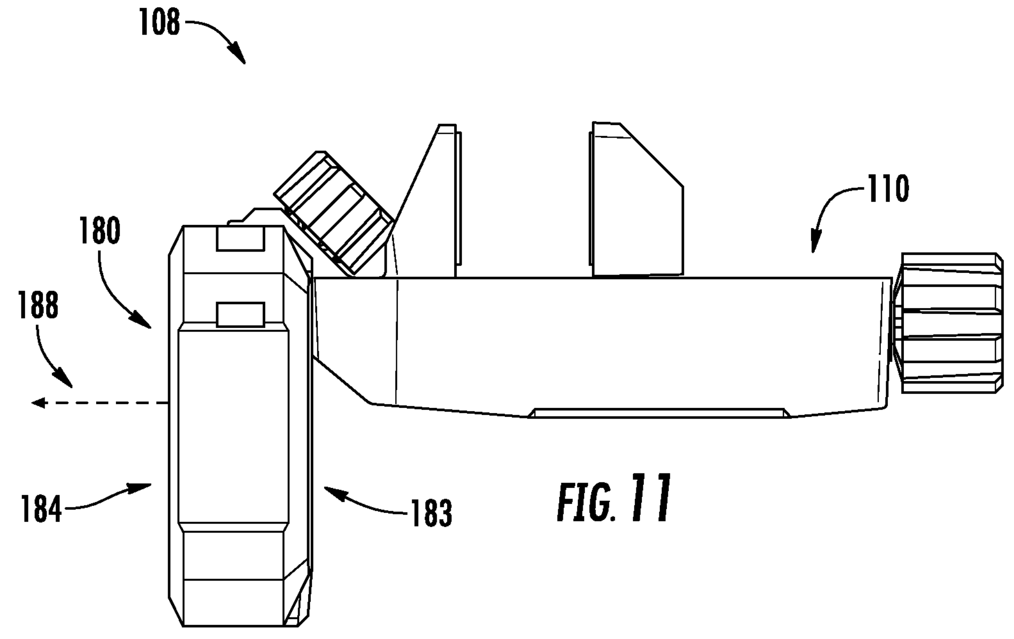
FIG. 11 is a side view of the laser level system of FIG. 9 coupled to the laser level detector of FIG. 9 in a different orientation than shown in FIG. 10, according to an exemplary embodiment.

Referring to FIGS. 9-11, body 182 of laser level detector 180 can be coupled to clamp 110 in at least two orientations. In a first orientation 181 (FIGS. 9-10), the front surface 184 of laser level detector 180 faces upward in a direction 186 parallel to the direction that arms 120, 122 extend from clamp 110. Stated another way, laser level detector 180 includes front face 184 that faces in direction 186 that is perpendicular to longitudinal axis 160 of body 112 when the detector is in the first position. In a second orientation 183 (FIG. 11), the front surface 184 of laser level detector 180 faces in direction 188 away from arms 120, 122 of clamp 110. Stated another way, front face 184 faces in direction 188 that is parallel to the longitudinal axis 160 of body 112 when the detector 180 is in the second position. In a specific embodiment, the laser level detector is rotated 90 degrees when transitioning from the first orientation to the second orientation.

Figures 12, 13:
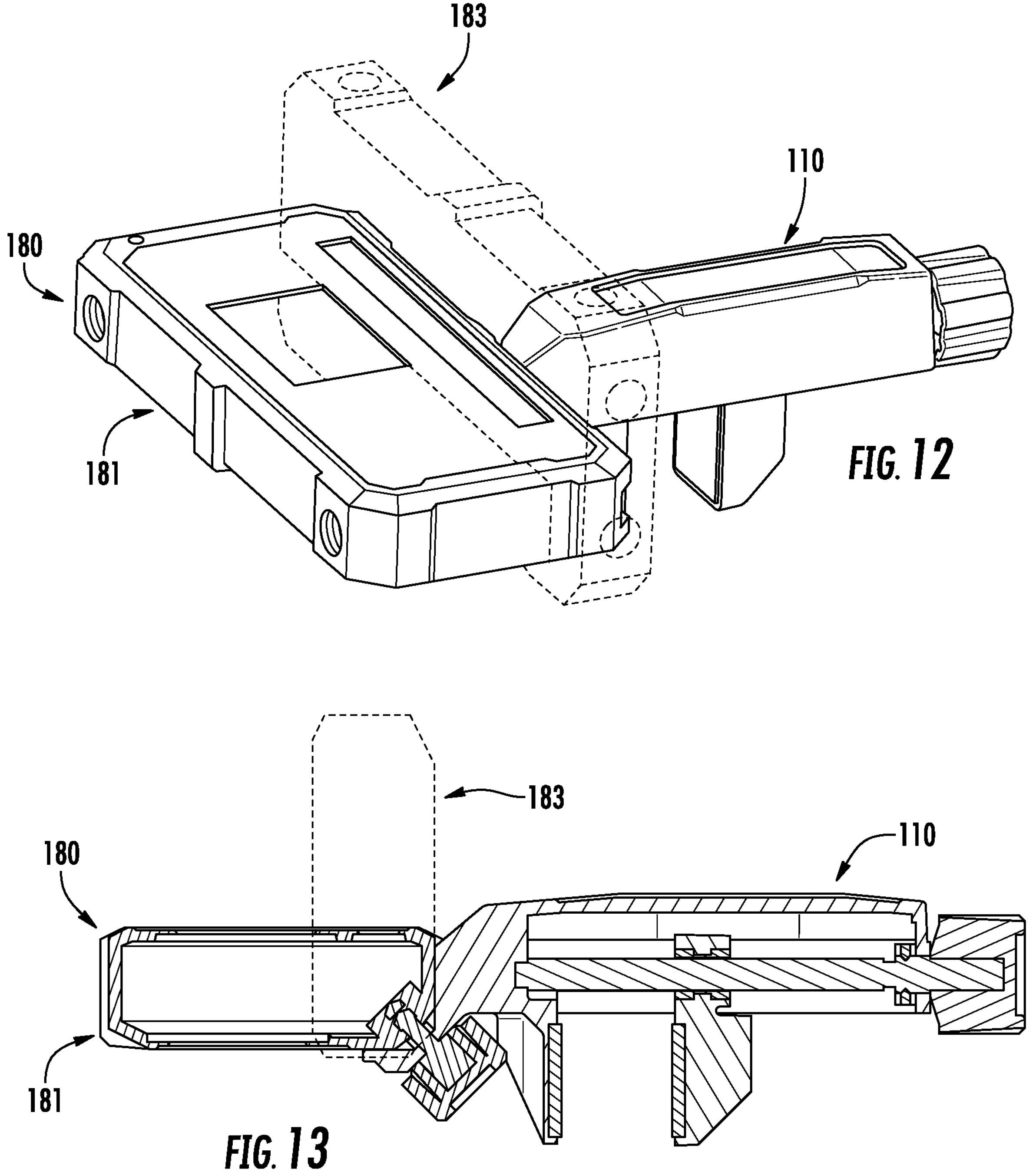
FIG. 12 is a perspective view of the clamp of FIG. 6 shown with a silhouette of an alternate position of the laser lever detector, according to an exemplary embodiment.
FIG. 13 is a side view of the clamp of FIG. 6 shown with a silhouette of an alternate position of the laser lever detector, according to an exemplary embodiment.
Figures 14, 15:
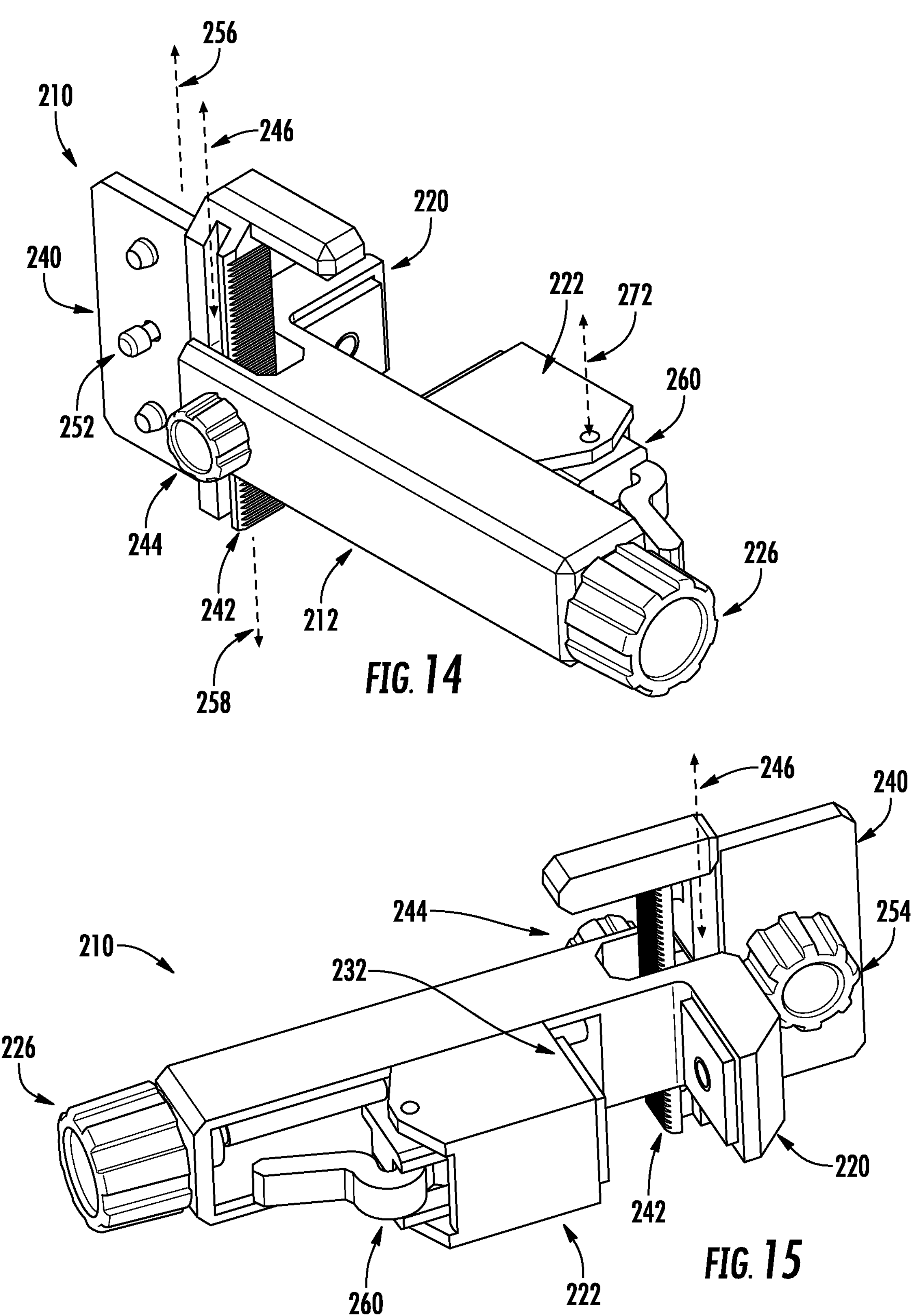
FIG. 14 is a perspective view of a clamp, according to an exemplary embodiment.
FIG. 15 is a perspective view of the clamp of FIG. 14, according to an exemplary embodiment.

Referring to FIGS. 12-13, various configurations of laser detector coupled to clamp 110 are shown. Referring to FIG. 12, laser detector 180 can be mounted to clamp 110 in the first orientation 181 or the second orientation 183, with second orientation 183 being shown in silhouette. Referring to FIG. 13, laser detector 180 can be mounted to clamp 110 in the first orientation 181 or the second orientation 183, with second orientation 183 being shown in silhouette. In various embodiments, the edge of body 112 aligns with the optical sensor on laser level detector 180 for alignment and marking on a workpiece.

Referring to FIGS. 14-29, clamp 210 is shown according to an exemplary embodiment. Clamp 210 is substantially the same as clamp 10 except for the differences discussed herein.

Clamp 210 includes a mechanism to perform macro-adjustments of the position of the laser level detector, and another mechanism to perform micro-adjustments of the position of the laser level detector. This is achieved by way of releasing a clamping force from second arm 222 to the workpiece, which can be supplied by securing element 260 and/or securing element 360. In particular, adjustment device, shown as knob 226, and securing element 260 permit macro-adjustments by adjusting the positioning of clamp 210 to a work piece, and micro-adjustments can be performed by a user rotating an adjustment mechanism, shown as knob 244, to adjust the position of mounting structure 240 with respect to body 212. In various embodiments, knob 244 is rotatably coupled to body 212. In various embodiments, knob 226 is configured to slide second arm 222 along axis 234 with respect to the first arm 220. In various embodiments, knob 244 is configured to slide mounting element 240 in a first direction 256 along axis 246 with respect to body 212, and a second direction 258 with respect to the body 212 opposite the first direction 256. In various embodiments, axis 234 is perpendicular to axis 246. In various embodiments, knob 244 rotates to slide mounting element 252 with respect to body 212.

Similar to clamp 10, in clamp 210 the second arm 222 slides with respect to first arm 220 to engage a work piece that clamp 210 couples to. A user actuates knob 226 to slide second arm 222 with respect to body 212 and first arm 220. A laser level detector is coupled to mounting element 252 of mounting structure 240. Mounting element 252 is slidably coupled to body 212 (e.g., via mounting structure 240 and mounting element 252 sliding with respect to body 212) such that mounting element 252 slides along axis 246 with respect to the body 212.

Mounting structure 240 slides along axis 246 with respect to body 212. In use, a user interfaces with an adjustment element, shown as knob 244, to adjust the position of mounting structure 240 with respect to body 212. In this way, a user can perform micro-adjustments to the positioning, such as the vertical positioning, of the laser level detector without having to decouple clamp 210 from the work piece. As will be explained, in various embodiments a user actuates a knob 244 (e.g., via twisting) to actuate a pinion gear to interface with rack gear 242, thereby sliding mounting structure 240 with respect to body 212.

Referring to FIGS. 16-19, aspects of securing element 260 of second arm 222 are shown. Securing element 260 is coupled to second arm 222, and securing element 260 is configured to extend an interfacing surface 232 from the second arm 222 towards the first arm 220 such that the structure clamp 210 is coupled to is coupled between the first arm and the interfacing surface. Securing element 260 toggles between a locked position and an unlocked position. Securing element 260 includes a lever 264, lever 264 rotating with respect to axis 272 to actuate the securing element 260 (e.g., surface 232 of securing element 260) with respect to the second arm. In use, a user actuates lever 264 to slide projection 262 via linking elements 268. In various embodiments, axis 272 is parallel to the second axis 246. Second arm 222 is slidably coupled via threaded insert 270 to the screw that extends along clamp 210. When the securing element 260 is in the locked position, the second arm 222 is biased against the structure with an increased force relative to when the securing element 260 is in the unlocked position.

When securing element 260 is in the locked position (FIGS. 16-17), force from the projection 262 will not move lever 264. When securing element is in the unlocked position (FIGS. 18-19), projection 262 is retracted and releases the clamped work piece. Securing element 260 is returned to the locked position via one or more biasing elements, shown as springs 266. In a specific embodiment, springs 266 comprise two torsion springs, one spring on each side of lever 264.

In use, a user moves second arm 222 to the desired position with respect to the work piece. Springs 266 bias the securing element 260 to the locked position shown in FIGS. 16-17 before coming into contact with the work piece. Then, optionally the user actuates lever 264 to slide projection outward (FIG. 17), thereby exerting an increased pushing force that interfacing surface 232 exerts against the work piece. In this way, the second arm 222 of clamp 210 can be more securely coupled to the work piece. To disengage the second arm 222 from the work piece, the user actuates lever 264 to retract projection 262 within securing element 260 (FIG. 19), thereby reducing the pushing force that interfacing surface 232 exerts against the work piece.

Referring to FIGS. 20-25, a user actuates knob 244 to rotate a geared interface, shown as pinion gear 248 that interfaces with rack gear 242. Mounting structure 240 can be repositioned with respect to body 212 by adjusting knob 244. In a specific embodiment, knob 244 is rotated clockwise (FIG. 23) to move mounting structure 240 upward with respect to body 212. In a specific embodiment, knob 244 is rotated counter-clockwise (FIG. 24) to move mounting structure 240 downward with respect to body 212.

Figure 25:
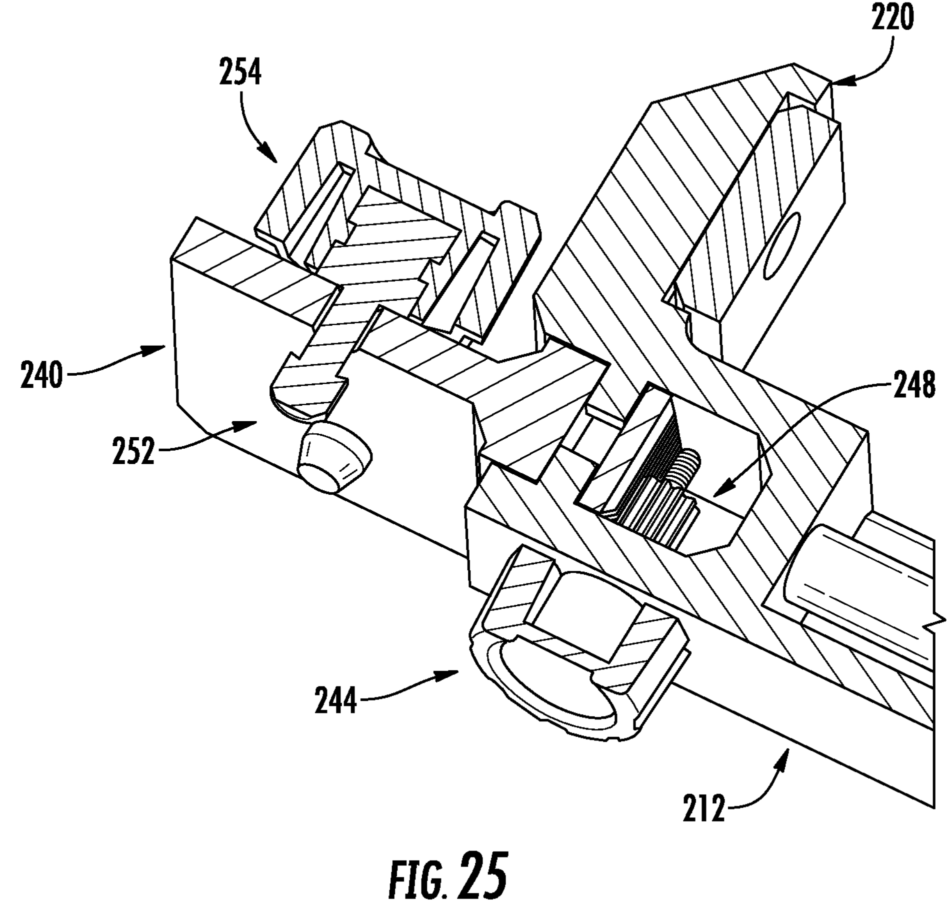
FIG. 25 is a perspective view of a cross-section of a portion of the clamp of FIG. 14, according to an exemplary embodiment.
Figures 26, 27, 28, 29:
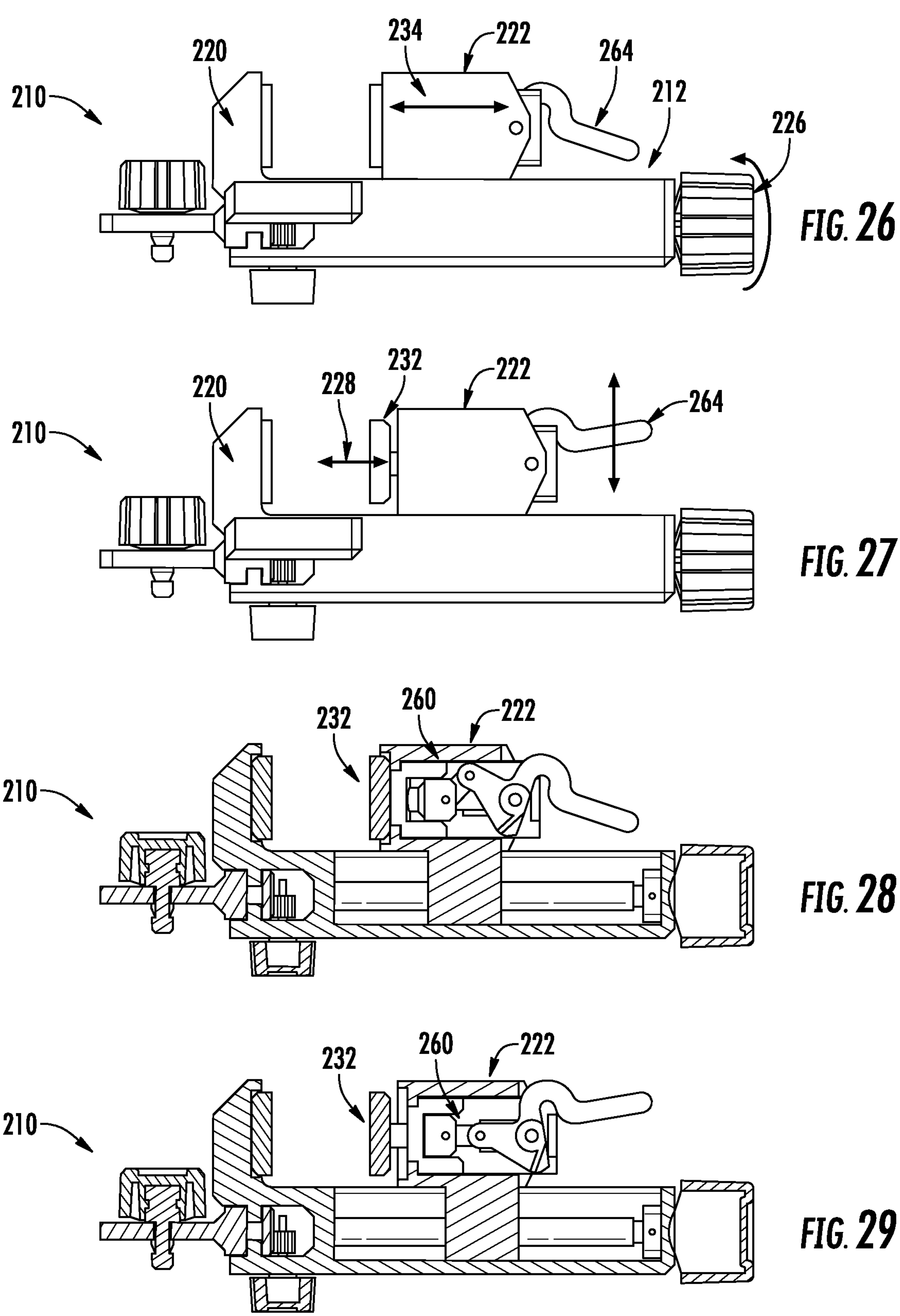
FIG. 26 is a side view of the clamp of FIG. 14, according to an exemplary embodiment.
FIG. 27 is a side view of the clamp of FIG. 14, according to an exemplary embodiment.
FIG. 28 is a side view of a cross-section of the clamp of FIG. 14, according to an exemplary embodiment.
FIG. 29 is a side view of a cross-section of the clamp of FIG. 14, according to an exemplary embodiment.

Referring to FIG. 25, a laser level detector is coupled to mounting structure 240 via mounting element 252. Stated another way, mounting element 252 is configured to detachably couple to a laser level detector. A user actuates an interfacing element, shown as knob 254, to couple and decouple a laser level detector to mounting element 252 of mounting structure 240.

Referring to FIGS. 26-29, shown are a series of configurations of clamp 210 as clamp is coupled to a work piece. Starting at FIG. 26, a user actuates knob 226 to slide second arm 222 along axis 234 with respect to body 212. The user actuates lever 264 upward or downward to extend or retract interfacing surface 232 along axis 228. In this way, the user can retract the interfacing surface 232 (FIG. 28) to disengage the second arm 222 from the work piece, and the user optionally extends the interfacing surface 232 (FIG. 29) to engage the second arm 222 with the work piece, although it is contemplated herein that clamp 210 may be secured to workpiece in various situations by actuating second arm 222 and without extending interfacing surface 232 of securing element 260.

Referring to FIGS. 30-33, securing element 360 is shown according to an exemplary embodiment. Securing element 360 is substantially the same as securing element 260 except for the differences discussed herein.

Securing element 360 actuates between a locked position (FIGS. 30-31) and an unlocked position (FIGS. 32-33). In the locked position, slider 362 and contact pad 366 are pressed forward engaging the clamped material (e.g., work piece). In the unlocked position, slider 362 and contact pad 366 are free to move backward and release the clamped material (e.g., work piece). Springs 368 bias lever 364, and thus securing element 360, towards the locked position. In various embodiments, lever 364 is a cam with at least 2 distinct points of displacement for slider 362.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed is:

1. A laser level system comprising:

a laser level detector; and a clamp comprising:

a body;

a plurality of arms extending from the body, the plurality of arms detachably and rigidly couple the body to a structure; and a mounting element rotatably coupled to the body, the mounting element detachably coupled to the laser level detector, the mounting element rotating around a first axis with respect to the body such that the laser level detector and the mounting element rotate together at least 90 degrees around the first axis with respect to the body while the laser level detector is coupled to the mounting element, the mounting element rotating around a second axis with respect to the body such that the laser level detector and the mounting element rotate around the second axis with respect to the body while the laser level detector is coupled to the mounting element, wherein the second axis is skew to the first axis such that the second axis and first axis are not parallel to each other and do not intersect each other;

the plurality of arms comprising a first arm rigidly coupled to the body and a second arm slidably coupled to the body, the second arm sliding along a third axis with respect to the body, wherein the third axis is perpendicular to each of the first axis and the second axis.

2. The laser level system of claim 1, comprising an interface element coupled to the body, the interface element configured to slide the second arm with respect to the body.

3. The laser level system of claim 1, wherein the laser level detector and the mounting element rotate together at least 90 degrees around the second axis with respect to the body while the laser level detector is coupled to the mounting element.

4. The laser level system of claim 1, wherein the second axis is perpendicular to a plane defined by the first axis and the third axis.

5. The laser level system of claim 4, wherein the third axis is perpendicular to the second axis.

* * * * *